United States Patent
Kawaraya et al.

(10) Patent No.: US 7,625,477 B2
(45) Date of Patent: Dec. 1, 2009

(54) ELECTRODEPOSITION PAINT

(75) Inventors: Masahide Kawaraya, Hiratsuka (JP); Toshimitsu Muramatsu, Yokosuka (JP); Yuji Hirose, Chigasaki (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 314 days.

(21) Appl. No.: 11/643,778

(22) Filed: Dec. 22, 2006

(65) Prior Publication Data

US 2007/0149655 A1 Jun. 28, 2007

(30) Foreign Application Priority Data

Dec. 27, 2005 (JP) .............................. 2005-376065

(51) Int. Cl.
*C25D 9/02* (2006.01)
*C08L 63/00* (2006.01)
*C08K 3/10* (2006.01)

(52) U.S. Cl. ........................ 205/317; 205/333; 523/402; 523/414; 523/440; 523/442; 523/457; 523/459; 523/460

(58) Field of Classification Search ................. 205/316, 205/317, 333; 523/400, 402, 414, 440, 442, 523/457, 458, 459, 460
See application file for complete search history.

(56) References Cited

U.S. PATENT DOCUMENTS

| | | | | |
|---|---|---|---|---|
| 6,312,813 | B1 * | 11/2001 | Miyatake et al. | 428/418 |
| 6,436,201 | B1 * | 8/2002 | Sugita et al. | 148/241 |
| 6,942,922 | B2 * | 9/2005 | Nishiguchi et al. | 428/418 |
| 2003/0082368 | A1 | 5/2003 | Reuter et al. | |
| 2003/0106804 | A1 * | 6/2003 | Nishiguchi et al. | 205/413 |

FOREIGN PATENT DOCUMENTS

| | | |
|---|---|---|
| EP | 0 509 437 | 1/1992 |
| JP | 5-65439 | 3/1993 |
| JP | 2000-290542 | 10/2000 |
| JP | 2004-269595 | 9/2004 |

* cited by examiner

*Primary Examiner*—Michael J Feely
(74) *Attorney, Agent, or Firm*—Wenderoth, Lind & Ponack, L.L.P.

(57) ABSTRACT

This invention provides an electrodeposition paint comprising particles of at least one metallic compound selected from bismuth hydroxide, zirconium compound and tungsten compound, said particles of the metallic compound having an average particle diameter of 1-1,000 nm. The electrodeposition paint forms coating film excelling in corrosion resistance, finished appearance, paint stability and so on.

4 Claims, No Drawings

ELECTRODEPOSITION PAINT

TECHNICAL FIELD

This invention relates to electrodeposition paint which gives coating film of excellent corrosion resistance, finished appearance and paint stability.

BACKGROUND ART

Electrodeposition paint forms coating film excelling in performances such as corrosion resistance, finished appearance and so on, and hence is broadly adopted in the field of utility wherein such performances are required, e.g., for coating automobile bodies or their parts.

Heretofore rust-preventive agent such as lead compound or chromium compound has been blended with electrodeposition paint for further improving the latter's corrosion resistance, but these compounds are highly harmful and their use gives rise to a problem for antipollution measure. Hence investigations have been made on non-toxic or low toxic rust-preventive agent to replace these lead compound or chromium compound.

For example, JP Hei 5(1993)-65439A (=EP-A-0509437) discloses an electrocoating composition comprising dialkyltin aromatic carboxylate and bismuth compound or zirconium compound, and JP 2000-290542A discloses an electrocoating composition comprising a compound selected from the group consisting of bismuth silicate, bismuth silicomolybdate, bismuth hydroxide and zirconium compound. However, these electrocoating compositions are not fully satisfactory in respect of corrosion resistance, in particular, long-term corrosion resistance as tested by anti-weathering test.

Furthermore, JP 2004-269595A discloses a cationic electrodeposition paint of which etch pitting resistance is improved by bismuth oxide of the maximum particle size of 1.5 μm contained therein.

DISCLOSURE OF THE INVENTION

The main object of the present invention is to provide electrodeposition paint which is excellent in corrosion resistance, finished appearance, paint stability and so on of its coating film.

We have made concentrative studies with the view to solve the above problem, and now discovered: in an electrodeposition paint comprising, as a rust-proventive component, particles of at least one metallic compound selected from bismuth hydroxide, zirconium compound and tungsten compound, when the metallic compound particles are blended in the form of fine particles having an average particle diameter of 1-1,000 nm, coating film formed of the paint exhibits remarkably improved corrosion resistance, in particular, conspicuous improvement in antiweathering test which is a long-term corrosion resistance test, and furthermore its electrocoatability on rustproof steel sheet, finished appearance, paint stability and so on also are improved, and completed the present invention.

Accordingly, therefore, the present invention provides an electrodeposition paint comprising particles of at least one metallic compound selected from bismuth hydroxide, zirconium compound and tungsten compound, characterized in that the average particle diameter of the metallic compound particles is 1-1,000 nm.

While the electrodeposition paint of the present invention encompasses both anionic and cationic electrodeposition paints, cationic electrodeposition paint is particularly preferred, from the viewpoint of corrosion resistance. Accordingly, hereinafter cationic electrodeposition paint is explained in further details.

The electrodeposition paint of the present invention comprises as the rust-preventive component particles of at least one metallic compound selected from bismuth hydroxide, zirconium compound and tungsten compound.

As the zirconium compound, for example, zirconium oxide, zirconium hydroxide, zirconium silicate and the like can be named; and as the tungsten compound, for example, tungstic acid, iron tungstate, tungsten oxide and the like can be named. Of those metallic compounds, bismuth hydroxide is the most preferred according to the present invention.

The electrodeposition paints of the present invention are characterized in that they contain these metallic compounds in the form of dispersed fine particles having an average particle diameter of 1-1,000 nm, preferably 10-700 nm, inter alia, 50-300 nm.

"Average particle diameter" in the present specification is a value measured with UPA-EX250 [tradename, Nikkiso Co. Ltd., a nanotrack particle size distribution measuring apparatus, dynamic light scattering method, laser-Doppler method (UPA method), measurable range=0.8-6,000 nm].

It is generally difficult to form such fine particulate metallic compound with ball mills that are customarily used for dispersing pigment. It can be obtained by treating the metallic compound with powerful grinding means, such as a planetary ball mill, homogenizer or the like, until the metallic compound having an average particle size within the specified range is obtained, normally for about 0.5-96 hours, preferably about 1-48 hours, inter alia, about 5-24 hours.

The electrodeposition paints of the present invention comprising these fine particulate metallic compounds can be prepared, for example, by the steps of forming a ground product of the metallic compound or compounds having the specified average particle size in advance by the means as above-exemplified; mixing and dispersing the ground product with, and in, at least one paint additive component selected from coloring pigment, extender, other rust-preventive pigment and organotin compound, pigment-dispersing resin and dispersing medium (water and/or organic solvent), and further optionally surfactant, water-soluble organic acid and the like, by a customary means to formulate a pigment-dispersed paste; and then mixing the paste with an emulsion for electrodeposition paint.

Alternatively, the electrodeposition paint of the present invention can also be formulated by the steps of mixing at least one metallic compound selected from bismuth hydroxide, zirconium compound and tungsten compound, with at least one paint additive component selected from coloring pigment, extender, other rust-preventive pigment and organotin compound, pigment-dispersing resin and dispersing medium (water and/or organic solvent), and further optionally surfactant, water-soluble organic acid and the like; co-grinding the mixture with aforesaid powerful grinding means such as planetary ball mill, homogenizer or the like until the solid particles dispersed in the pigment-dispersed paste become fine particles having an average particle diameter of 1-1,000 nm, preferably 10-700 nm, inter alia, 50-300 nm, to form a pigment-dispersed paste; and mixing the paste with an emulsion for electrodeposition paint.

As the coloring pigment used in the occasion of preparing the pigment-dispersed paste, for example, white pigment such as titanium white, zinc flower, lithopone, zinc sulfide, antimony white and the like; and black pigment such as carbon black, acetylene black, graphite, black iron oxide, Aniline Black and the like can be named. As the extender, for example, clay, mica, baryta, talc, calcium carbonate, silica and the like can be named. As other rust-preventive pigment, for example, aluminum phosphomolybdate, dihydrogenaluminum tripolyphosphate, zinc oxide and the like can be named, and as the organotin compound, for example, dibutyltin oxide (DBTO), dioctyltin oxide (DOTO) and the like can be named. According to the invention, furthermore, use rate of these organotin compounds may be reduced from conventional level, or their use can be omitted.

As the pigment-dispersing resin to be used in the occasion of preparing the pigment-dispersed paste, tertiary amino-containing epoxy resin, quaternary ammonium salt-type epoxy resin, tertiary amino-containing acrylic resin, quaternary ammonium salt-type acrylic resin and the like can be named, and of these, tertiary amino-containing epoxy resin or quaternary ammonium salt-type epoxy resin are preferred.

As the surfactant which is used where necessary, for example, nonionic surfactant such as polyoxyethylene alkyl ether, polyoxyethylene alkylallyl ether, polyoxyethylene derivatives, sorbitan fatty acid ester, polyoxyethylene sorbitan fatty acid ester, glycerine fatty acid ester, polyoxyethylene fatty acid ester, polyoxyethylene alkylamine, alkylalkanolamide and the like; anionic surfactant such as fatty acid salt, alkylsulfuric acid ester salt, alkylbenzene sulfonic acid salt, alkylphosphoric acid salt the like; and ampholytic surfactant such as alkyl betaine and the like can be named. As the water-soluble organic acid, for example, acetic acid, formic acid, lactic acid, propionic acid, hydroxyacetic acid, methoxyacetic acid, maleic acid, fumaric acid and the like can be named.

As the organic solvent serviceable as the dispersing medium, for example, ketone solvent such as acetone, methyl ethyl ketone and the like; ether solvent such as diethyl ether, diethylene glycol monobutyl ether and the like; and alcoholic solvent such as methanol, ethanol, n-propanol, isopropanol and the like can be named.

The electrodeposition paint of the present invention can contain base resin and crosslinking agent as the vehicle component. In the present invention, cationic electrodeposition paint containing cationic resin as the base resin and blocked polyisocyanate compound as the crosslinking agent is particularly preferred, but the invention is not limited thereto.

The cationic resin which is used as the base resin in the cationic electrodeposition paint refers to such resins which contain in their molecules cationizable groups such as amino, ammonium salt, sulfonium salt, phosphonium salt or the like groups. The resin species may be any of those customarily used as resins for electrodeposition paint, for example, epoxy resin, acrylic resin, polybutadiene resin, alkyd resin, polyester resin and the like. In particular, amine-added epoxy resin which is obtained through addition reaction of epoxy resin with amino-containing compound is preferred.

As examples of such amine-added epoxy resin, (1) adducts of epoxy resin with primary mono- and poly-amines, secondary mono- and poly-amines, or mixed primary and secondary polyamines (see, for example, U.S. Pat. No. 3,984,299); (2) adducts of epoxy resin with secondary mono- and poly-amines having ketiminated primary amino groups (see, for example, U.S. Pat. No. 4,017,438); (3) reaction products obtained by etherification of epoxy resin and hydroxy compound having ketiminated primary amino groups (see, for example, JP Sho 59 (1984) -43013A) and the like can be named.

The epoxy resin which is used for the preparation of above amine-added epoxy resin is a compound having at least one, preferably two or more, epoxy groups per molecule. Generally those having number-average molecular weight of at least 200, preferably 400-4,000, inter alia, 800-2,500; and epoxy equivalent of at least 160, preferably in the range of 180-2,500, inter alia, 400-1,500, are suitable. In particular, those obtained through reaction of polyphenol compound with epihalohydrin are prefered.

Here the "number-average molecular weight" is a value calculated from the chromatogram taken by RI refractometer and polystyrene calibration curve following the method specified by JIS K 0124-83, using TSK GEL 4000 HXL+G3000HXL+G2500HXL+G2000HXL (Tosoh Corporation) as the separation columns and tetrahydrofuran for GPC as the eluent, at 40° C. and flow rate of 1.0 ml/min.

As examples of the polyphenol compound useful for forming the epoxy resin, bis (4-hydroxyphenyl)-2,2-propane, 4,4'-dihydroxybenzophenone, bis(4-hydroxyphenyl)-1,1-ethane), bis-(4-hydroxyphenyl)-1,1-isobutane, bis (4-hydroxy-2 or 3-tert-butylphenyl)-2,2-propane, bis (2-hydroxynaphthyl)methane, tetra-(4-hydroxyphenyl)-1,1,2,2-ethane, 4,4'-dihydroxydiphenylsulfone, phenol novolac, cresol novolac and the like can be named.

The epoxy resins may be those which are partially reacted with polyol, polyetherpolyol, polyesterpolyol, polyamidamine, polycarboxylic acid, polyisocyanate compound or the like. Furthermore, they may be those which are graft polymerized with lactones such as $\epsilon$-caprolactone, acrylic monomer or the like.

As examples of primary mono- and poly-amines, secondary mono- and poly-amines or mixed primary and secondary polyamines, which are used for preparing above amine-added epoxy resin (1), mono- or di-alkylamines such as monomethylamine, dimethylamine, monoethylamine, diethylamine, monoisopropylamine, diisopropylamine, monobutylamine, dibutylamine and the like; alkanolamines such as monoethanolamine, diethanolamine, mono(2-hydroxypropyl)amine, monomethylaminoethanol and the like; and alkylenepolyamines such as ethylenediamine, propylenediamine, butylenediamine, hexamethylenediamine, diethylenetriamine, triethylenetetramine and the like can be named.

As the secondary mono- and poly-amines having ketiminated primary amino groups which are used in preparation of above amine-added epoxy resin (2), for example, ketimination products obtained by reacting the compounds having primary amino groups which are selected from the primary mono- and poly-amines, secondary mono- and poly-amines and mixed primary and secondary polyamines that are used for preparing above amine-added epoxy resin (1), such as monomethylamine, monoethanolamine, ethylenediamine, diethylenetriamine and the like, with ketone compound can be used.

As the hydroxy compounds having ketiminated primary amino groups, which are used for preparation of above amine-added epoxy resin (3), for example, hydroxyl-containing ketimination products obtained by reacting the compounds having primary amino groups and hydroxyl groups, which are selected from the primary mono- and poly-amines, secondary mono- and poly-amines and mixed primary and secondary polyamines that are used for preparation of above amine-added epoxy resin (1), such as monoethanolamine, mono(2-hydroxypropyl) amine and the like, with ketone compound can be used.

In particular, it is preferred from the viewpoint of improving corrosion resistance of the coating-film, to use as the base resin a xylene-formaldehyde resin-modified amino-containing epoxy resin which is obtained by reacting an epoxy resin having an epoxy equivalent of 180-3,000, preferably 250-2,000, with xylene-formaldehyde resin and amino-containing compound.

As the epoxy resin useful as a starting material for preparing the amino-containing epoxy resin, those useful for aforesaid cationic resins can be used.

Xylene-formaldehyde resin is used for internal plasticization (modification) of the epoxy resin, which can be prepared, for example, by subjecting xylene, formaldehyde and optionally phenols to a condensation reaction in the presence of an acidic catalyst.

As the formaldehyde, for example, industrially readily available formalin, paraformaldehyde, compounds which generate formaldehyde such as trioxane, and the like can be used.

The phenols include monohydric or dihydric phenolic compounds having 2 or 3 reaction sites. As specific examples, phenol, cresol, para-octylphenol, nonylphenol, bisphenol-propane, bisphenolmethane, resorcine, pyrocatechol, hydroquinone, para-tert-butylphenol, bisphenolsulfone, bisphenol ether, para-phenylphenol and the like can be named. Those can be used either singly or in combination of two or more. Of those, phenol and cresol are particularly preferred.

As the acidic catalyst useful in the condensation reaction of xylene, formaldehyde, and optionally phenols, for example, sulfuric acid, hydrochloric acid, paratoluenesulfonic acid, oxalic acid and the like can be named. In general, sulfuric acid is particularly suitable.

The condensation reaction can be conducted by heating the reaction system, for example, to a temperature at which xylene, phenols, water, formalin and the like that are present in the reaction system reflux, normally to about 80° C.-about 100° C. The reaction can be completed normally in about 2-6 hours.

Xylene-formaldehyde resin can be obtained by thermally reacting xylene, formaldehyde and optionally phenols in the presence of an acidic catalyst, under the above-described conditions.

Thus obtained xylene-formaldehyde resin normally has a viscosity value within a range of 20-50,000 centipoise (25° C.), preferably 25-30,000 centipoise (25° C.), inter alia, 30-15,000 centipoise (25° C.), and preferably has a hydroxyl equivalent generally within a range of 100-50,000, in particular, 150-30,000, inter alia, 200-10,000.

The amino-containing compound is a cationic property-imparting component, which cationizes the epoxy resin by introducing amino groups into the epoxy resin. As specific examples, compounds similar to those used in the occasion of preparing aforesaid cationic resins can be used.

Above reactions of xylene-formaldehyde resin and amino-containing compound with epoxy resin can be conducted by optional order, while it is generally preferred to have the xylene-formaldehyde resin and the amino-containing compound simultaneously react with the epoxy resin.

The above addition reaction is normally conducted in a suitable solvent at temperatures between about 80 and about 170° C., preferably between about 90 and about 150° C., for around 1-6 hours, preferably around 1-5 hours. As the solvent, for example, hydrocarbon solvent such as toluene, xylene, cyclohexane, n-hexane and the like; ester solvent such as methyl acetate, ethyl acetate, butyl acetate and the like; ketone solvent such as acetone, methyl ethyl ketone, methyl isobutyl ketone, methyl amyl ketone and the like; amide solvent such as dimethylformamide, dimethylacetamide and the like; alcohol solvent such as methanol, ethanol, n-propanol, iso-propanol and the like; or mixtures of the foregoing can be used.

The use ratios of the reactants in the above addition reaction are not critical and can be suitably altered, while their adequate ranges based on the total solid mass of the three components of epoxy resin, xylene-formaldehyde resin and amino-containing compound are ad follows: epoxy resin, generally 50-90 mass %, in particular, 50-85 mass %; xylene-formaldehyde resin, generally 5-45 mass %, in particular, 6-43 mass %; and amino-containing compound, generally 5-25 mass %, in particular, 6-20 mass %.

Where the cationic resins contain amino groups as the cationizable group, they can be made water-soluble or water-dispersible upon being neutralized with an acid, e.g., organic carboxylic acid such as formic acid, acetic acid, propionic acid, lactic acid and the like; and inorganic acid such as hydrochloric acid, sulfuric acid and the like.

As a hardening agent which is used concurrently with above-described base resin, blocked polyisocyanate compound which is a product of approximalely stoichiometric addition reaction of a polyisocyanate compound and a blocking agent, is preferred in respect of hardening property and corrosion resistance.

As the polyisocyanate compound used herein, those already known can be used, for example, aromatic, aliphatic or alicyclic polyisocyanate compounds such as tolylene diisocyanate, xylylene diisocyanate, phenylene diisocyanate, diphenylmethane-2,4'-diisocyanate, diphenylmethane-4,4'-diisocyanate (normally referred to as MDI), crude MDI, bis (isocyanatomethyl)cyclohexane, tetramethylene diisocyanate, hexamethylene diisocyanate, methylene diisocyanate, isophorone diisocyanate and the like; cyclized polymers of these polyisocyanate compounds, isocyanate biuret compounds; terminal isocyanato-containing compounds that are obtained through reaction of an excessive amount of these polyisocyanate compounds with low molecular weight, active hydrogen-containing compounds such as ethylene glycol, propylene glycol, trimethylolpropane, hexanetriol, castor oil and the like. These can be used either singly or in combination of two or more.

On the other hand, a blocking agent adds to isocyanato groups of a polyisocyanate compound and blocks them. The blocked polyisocyanate compound formed upon the addition is preferably such that it is stable at normal temperature but the blocking agent dissociates when it is heated to a baking temperature of coating film (normally about 100-about 200° C.) to regenerate free isocyanato groups.

As blocking agents which satisfy such requirements, for example, lactam compounds such as ε-caprolactam, γ-butyrolactam and the like; oxime compounds such as methyl ethyl ketoxime, cyclohexanonoxime and the like; phenolic compounds such as phenol, para-t-butylphenol, cresol and the like; aliphatic alcohols such as n-butanol, 2-ehtylhexanol and the like; aromatic alkylalcohols such as pheneylcarbinol, methylphenylcarbinol and the like; and ether alcohol compounds such as ethylene glycol monobutyl ether, diethylene glycol monoethyl ether and the like can be named.

The base resin and hardening agent as above-described can be used generally within the ranges of, respectively, 50-95 mass %, in particular, 65-85 mass %, of the base resin; and 5-50 mass %, in particular, 15-35 mass %, of the hardening agent; based on the total solid content of the two components.

An emulsion for the cationic electrodeposition paint can be formulated by thoroughly mixing the above-described base resin and hardening agent, concurrently with other suitable paint additives to make a dissolving varnish, and then adding thereto a neutralizer selected from formic acid, acetic acid, lactic acid, propionic acid, citric acid, malic acid, sulfamic acid and mixtures of two or more of the above-named, in an aqueous medium to disperse it in the water.

Subsequently adding the earlier described pigment-dispersed paste to the emulsion, and diluting the same with an aqueous medium where necessary, the cationic electrodeposition paint can be formulated.

The suitable blend ratio of fine particles of at least one metallic compound selected from bismuth hydroxide, zirconium compound and tungsten compound, in the so prepared electrodeposition paint, from the viewpoint of corrosion resistance and paint stability, is within a range of 0.01-10 wt parts, preferably 0.05-8 wt parts, inter alia, 0.1-5 wt parts, per 100 wt parts of the combined solid contents of the base resin and crosslinking agent.

The cationic electrodeposition paint of the present invention as formulated in the above-described manner is applicable onto desired electrically conductive substrate surface by means of electrocoating. The electrocoating is operable, in general terms, using a bath of the cationic electrodeposition paint, which has been diluted with deionized water or the like to a solid concentration of from about 5 to about 40 mass % and at a pH adjusted to a range of 5.5-9.0, normally under the conditions of 15-35° C. in bath temperature and at an applied voltage of 100-400 V.

The coating film thickness formed of the cationic electrodeposition paint is subject to no particular limitation, while a generally preferred range is 10-40 μm in terms of the hardened coating film. Generally adequate baking temperature of the coating film ranges from about 120 to about 200° C., in particular, from about 140 to about 180° C.; and the baking time can normally range around 5-60 minutes, preferably 10-30 minutes.

EXAMPLES

Hereinafter the invention is further specifically explained referring to working Examples, it being understood that the invention is not limited to these Examples only. In the following, parts and % signify mass parts and mass %.

Grinding of Bismuth Hydroxide

Production Example 1

One-hundred (100) parts of bismuth hydroxide was charged in PM-400 (Note 1) and ground for 20 hours, using 1000 parts of zirconia beads having a particle size of 0.5 mm, to provide fine bismuth hydroxide particles No. 1 having an average particle diameter of 60 nm.
(Note 1) PM-400: tradename, Retsch Technology GmbH; a planetary ball mill Production Examples 2-7

Operation of Production Example 1 was repeated except that the grinding time was varied, to provide the ground product Nos. 2-7 of bismuth hydroxide or bismuth oxide as identified in the following Table 1.

TABLE 1

| | Production Example 1 | Production Example 2 | Production Example 3 | Production Example 4 | Production Example 5 | Production Example 6 | Production Example 7 |
|---|---|---|---|---|---|---|---|
| Ground product | No. 1 | No. 2 | No. 3 | No. 4 | No. 5 | No. 6 | No. 7 |
| Grinding means | planetary ball mill | planetary ball mill | planetary ball mill | planetary ball mill | planetary ball mill | planetary ball mill | planetary ball mill |
| Bismuth hydroxide | 100 parts | 100 parts | 100 parts | 100 parts | 100 parts | | |
| Bismuth oxide | | | | | | 100 parts | 100 parts |
| Grinding time (hrs.) | 20 | 15 | 10 | 5 | 1 | 10 | 5 |
| Average particle diameter (nm) | 60 | 120 | 550 | 850 | 1300 | 550 | 850 |

Preparation of Pigment-Dispersing Resin

Production Example 8

To 1010 parts of EPICOAT828EL (tradename, Japan Epoxy Resins Co., an epoxy resin), 390 parts of bisphenol A, 240 parts of polycaprolactonediol (number-average molelcular weight≈1,200) and 0.2 part of dimethylbenzylamine were added, and reacted until the epoxy equivalent reached about 1,090 at 130° C.

Then 134 parts of dimethylethanolamine and 90 parts of acetic acid were added and reacted at 120° C. for 4 hours, and the solid content of the reaction product was adjusted by addition of ethylene glycol monobutyl ether, to provide an ammonium salt type pigment-dispersing resin having a solid content of 60% and an ammonium salt value of 44 mgKOH/g.

Preparation of Pigment-Dispersed Pastes

Production Example 9

A 1L-ball mill was charged with 5.8 parts (solid content, 3.5 parts) of the pigment-dispersing resin as obtained in Production Example 8, 14 parts of titanium white, 7 parts of clay, 1 part of dioctyltin oxide, 2 parts of the ground product No. 1 as obtained in Production Example 1 (average particle diameter of the bismuth oxide=60 nm) and 20.2 parts of deionized water, which were dispersed for 20 hours to provide a pigment-dispersed paste No. 1 having a solid content of 55%.

Production Examples 10-22B

Pigment-dispersed paste Nos. 2-15 were obtained using the blent compositions and dispersing (grinding) means, with the dispersing time as indicated in the following Table 2. Average particle diameters of the dispersed solid particles in the resulting pigment-dispersed pastes also are shown in Table 2.

TABLE 2

| | Production Example 9 | Production Example 10 | Production Example 11 | Production Example 12 | Production Example 13 | Production Example 14 | Production Example 15 |
|---|---|---|---|---|---|---|---|
| Pigment-dispersed Paste | No. 1 | No. 2 | No. 3 | No. 4 | No. 5 | No. 6 | No. 7 |
| Dispersing (grinding) means | ball mill | ball mill | ball mill | ball mill | planetary ball mill | planetary ball mill | planetary ball mill |
| Pigment-dispersing Resin (solid content 60%) | 5.8 (3.5) | 5.8 (3.5) | 5.8 (3.5) | 5.8 (3.5) | 5.8 (3.5) | 5.8 (3.5) | 5.8 (3.5) |
| Titanium white | 14 | 14 | 14 | 14 | 14 | 14 | 14 |
| Clay | 7 | 7 | 7 | 7 | 7 | 7 | 7 |
| Dioctyltin oxide | 1 | 1 | 1 | 1 | 1 | 1 | 1 |
| Ground bismuth hydroxide No. 1 (60 nm) | 2 | | | | | | |
| Ground bismuth hydroxide No. 2 (120 nm) | | 2 | | | | | |
| Ground bismuth hydroxide No. 3 (550 nm) | | | 2 | | | | |
| Ground bismuth hydroxide No. 4 (850 nm) | | | | 2 | | | |
| Ground bismuth hydroxide No. 5 (1300 nm) | | | | | | | |
| Bismuth hydroxide (4500 nm) | | | | | 2 | | |
| Zirconium hydroxide (4500 nm) | | | | | | 2 | |
| Tungsten oxide (4000 nm) | | | | | | | 2 |
| Ground bismuch oxide No. 6 (550 nm) | | | | | | | |
| Ground bismuch oxide No. 7 (850 nm) | | | | | | | |
| Deionized water | 20.2 | 20.2 | 20.2 | 20.2 | 20.2 | 20.2 | 20.2 |
| Pigment-dispersed paste (solid content 55%) | 50 (27.5) | 50 (27.5) | 50 (27.5) | 50 (27.5) | 50 (27.5) | 50 (27.5) | 50 (27.5) |
| Average particle diameter (nm) | 2500 | 3000 | 3500 | 3500 | 250 | 250 | 550 |
| Dispersing time (hrs) | 20 | 20 | 20 | 20 | 15 | 15 | 12 |

| | Production Example 16 | Production Example 17 | Production Example 18 | Production Example 19 | Production Example 20 | Production Example 21 | Production Example 22A | Production Example 22B |
|---|---|---|---|---|---|---|---|---|
| Pigment-dispersed Paste | No. 8 | No. 9 | No. 10 | No. 11 | No. 12 | No. 13 | No. 14 | No. 15 |
| Dispersing (grinding) means | planetary ball mill | planetary ball mill | planetary ball mill | ball mill | ball mill | ball mill | ball mill | ball mill |
| Pigment-dispersing Resin (solid content 60%) | 5.8 (3.5) | 5.8 (3.5) | 5.8 (3.5) | 5.8 (3.5) | 5.8 (3.5) | 5.8 (3.5) | 5.8 (3.5) | 5.8 (3.5) |
| Titanium white | 14 | 14 | 14 | 14 | 14 | 14 | 14 | 14 |
| Clay | 7 | 7 | 7 | 7 | 7 | 7 | 7 | 7 |
| Dioctyltin oxide | 1 | 1 | 1 | 1 | 1 | 1 | 1 | |
| Ground bismuth hydroxide No. 1 (60 nm) | | | | | | | | |
| Ground bismuth hydroxide No. 2 (120 nm) | | | | | | | | 3 |
| Ground bismuth hydroxide No. 3 (550 nm) | | | | | | | | |
| Ground bismuth hydroxide No. 4 (850 nm) | | | | | | | | |
| Ground bismuth hydroxide No. 5 (1300 nm) | 2 | | | | | | | |
| Bismuth hydroxide (4500 nm) | | 2 | | | | | | |
| Zirconium hydroxide (4500 nm) | | | 2 | | | | | |

TABLE 2-continued

| | | | | | | | | |
|---|---|---|---|---|---|---|---|---|
| Tungsten oxide (4000 nm) | | | | 2 | | | | |
| Ground bismuch oxide No. 6 (550 nm) | | | | | | 2 | | |
| Ground bismuch oxide No. 7 (850 nm) | | | | | | | 2 | |
| Deionized water | 18.2 | 20.2 | 20.2 | 20.2 | 20.2 | 20.2 | 18.6 | 20.2 |
| Pigment-dispersed paste (solid content 55%) | 50 (27.5) | 50 (27.5) | 50 (27.5) | 50 (27.5) | 50 (27.5) | 50 (27.5) | 46.4 (25.5) | 50 (27.5) |
| Average particle diameter (nm) | 2500 | 1500 | 1500 | 3800 | 3500 | 3500 | 2500 | 2500 |
| Dispersing time (hrs) | 3 | 6 | 6 | 20 | 20 | 20 | 20 | 20 |

(The numerals in the parenthesis show the solid contents.)

PREPARATION OF RESIN FOR CATIONIC ELECTRODEPOSITION PAINT

Production Example 23

Preparation of Base Resin (A) A 2L-separable flask equipped with a thermometer, reflux condenser and stirrer was charged with 240 parts of 50% formaline, 55 parts of phenol, 101 parts of 98% industrial sulfuric acid and 212 parts of meta-xylene, which were reacted at 84-88° C. for 4 hours. After termination of the reaction, the reaction mixture was allowed to stand to be separated into the resin phase and aqueous sulfuric acid phase. The resin phase was washed three times with water, stripped of unreacted meta-xylene for 20 minutes under the conditions of 20-30 mmHg/120-130° C., to provide a xylene-formaldehyde resin having a viscosity of 1050 centipoise (25° C.)

(B) A flask was charged with 1,000 parts of EPICOAT828EL (tradename, Japan Epoxy Resins Co.; an epoxy resin, epoxy equivalent=190, molecular weight=350), 400 parts of bisphenol A and 0.2 part of dimethylbenzylamine, which were reacted at 130° C. until the epoxy equivalent rose to 750. Then 300 parts of the xylene-formaldehyde resin as obtained in above (A), 140 parts of diethanolamine and 65 parts of ketiminated diethylenetriamine were added and reacted at 120° C. for 4 hours, followed by addition of 420 parts of ethylene glycol monobutyl ether, to provide a xylene-formaldehyde resin-modified, amino-containing epoxy resin having an amine value of 52 and solid resin content of 80%.

Production Example 24

Preparation of Hardening Agent

To 270 parts of COSMONATE M-200 (tradename, Mitsui chemical Co., crude MDI), 46 parts of methyl isobutyl ketone was added and together heated to 70° C. Further, 281 parts of diethylene glycol monoethyl ether was slowly added, and thereafter the temperature was raised to 90° C. While maintaining this temperature, the reaction mixture was sampled with time. When absence of absorption attributable to unreacted isocyanate was confirmed by infrared absorption spectrum measurement, the reaction was stopped. Adjusting the amount of the solvent, a blocked polyisocyanate type hardening agent having a solid content of 90% was obtained.

Production Example 25

Preparation of Emulsion for Electrodeposition Paint

An emulsion having a solid content of 34% was obtained by mixing 87.5 parts (solid content=70 parts) of the xylene-formaldehyde resin-modified, amino-containing epoxy resin having a resin solid content of 80% as obtained in Production Example 23, 33.3 parts (solid content=30 parts) of the hardening agent as obtained in Production Example 24 and 8.2 parts of 10% formic acid, uniformly stirring the mixture and dropping thereinto 165 parts of deionized water over about 15 minutes under violent stirring.

Preparation of Cationic Electrodeposition Paint

Example 1

To 294 parts (solid content=100 parts) of the emulsion as obtained in Production Example 25, 50 parts (solid content=27.5 parts) of pigment-dispersed paste No. 1 as obtained in Production Example 9 and 293.5 parts of deionized water were added to provide cationic electrodeposition paint No. 1 having a solid content of 20%.

Examples 2-8

Cationic electrodeposition paint Nos. 2-7B were obtained in the manner similar to Example 1, with each the blend ratios as indicated in the following Table 3.

TABLE 3

|  |  | Example 1 | Example 2 | Example 3 | Example 4 | Example 5 | Example 6 | Example 7 | Example 8 |
|---|---|---|---|---|---|---|---|---|---|
| Cationic electro-deposition paint | | No. 1 | No. 2 | No. 3 | No. 4 | No. 5 | No. 6 | No. 7A | No. 7B |
| Paint Compo-sition | Emulsion | 294 (100) | 294 (100) | 294 (100) | 294 (100) | 294 (100) | 294 (100) | 294 (100) | 294 (100) |
| | Pigment-dispersed paste No. 1 | 50 (27.5) | | | | | | | |
| | Pigment-dispersed paste No. 2 | | 50 (27.5) | | | | | | |
| | Pigment-dispersed paste No. 3 | | | 50 (27.5) | | | | | |
| | Pigment-dispersed paste No. 4 | | | | 50 (27.5) | | | | |
| | Pigment-dispersed paste No. 5 | | | | | 50 (27.5) | | | |
| | Pigment-dispersed paste No. 6 | | | | | | 50 (27.5) | | |
| | Pigment-dispersed paste No. 7 | | | | | | | 50 (27.5) | |
| | Pigment-dispersed paste No. 15 | | | | | | | | 50 (27.5) |
| | Deionized water | 293.5 | 293.5 | 293.5 | 293.5 | 293.5 | 293.5 | 293.5 | 343.5 |
| 20% Bath | | 637.5 (127.5) | 637.5 (127.5) | 637.5 (127.5) | 637.5 (127.5) | 637.5 (127.5) | 637.5 (127.5) | 637.5 (127.5) | 637.5 (127.5) |

(The numerals in the parentheses show the solid contents.)

Comparative Examples 1-7

Cationic electrodeposition paint Nos. 8-14 were obtained in the manner similar to Example 1, with each the blend ratios as indicated in the following Table 4.

Preparation of Test Panels

Using each of the cationic electrodeposition paint as obtained in the above Examples and Comparative Examples, zinc phosphate-treated, cold-rolled steel sheets (0.8 mm×70 mm×150 mm) were electrocoated to a dry film thickness of 20

TABLE 4

|  |  | Comparative-Example 1 | Comparative-Example 2 | Comparative-Example 3 | Comparative-Example 4 | Comparative-Example 5 | Comparative-Example 6 | Comparative-Example 7 |
|---|---|---|---|---|---|---|---|---|
| Cationic electro-deposition paint | | No. 8 | No. 9 | No. 10 | No. 11 | No. 12 | No. 13 | No. 14 |
| Paint Compo-sition | Emulsion | 294 (100) | 294 (100) | 294 (100) | 294 (100) | 294 (100) | 294 (100) | 294 (100) |
| | Pigment-dispersed paste No. 8 | 50 (27.5) | | | | | | |
| | Pigment-dispersed paste No. 9 | | 50 (27.5) | | | | | |
| | Pigment-dispersed paste No. 10 | | | 50 (27.5) | | | | |
| | Pigment-dispersed paste No. 11 | | | | 50 (27.5) | | | |
| | Pigment-dispersed paste No. 12 | | | | | 50 (27.5) | | |
| | Pigment-dispersed paste No. 13 | | | | | | 50 (27.5) | |
| | Pigment-dispersed paste No. 14 | | | | | | | 46.4 (25.5) |
| | Deionized water | 293.5 | 293.5 | 293.5 | 293.5 | 293.5 | 293.5 | 287.1 |
| 20% Bath | | 637.5 (127.5) | 637.5 (127.5) | 637.5 (127.5) | 637.5 (127.5) | 637.5 (127.5) | 637.5 (127.5) | 627.5 (125.5) |

(The numerals in the parentheses show the solid contents.)

μm and baked at 170° C. for 20 minutes to provide test panels. The panels were given the tests in the following manner. The results were as shown in later-appearing Tables 5 and 6.

(Note 2) Paint Stability:

Each of the cationic electrodeposition paint placed in a 3L-container with open top was stirred at 30° C. for 4 weeks, and thereafter filtered through a 400 mesh-filtration net, to be measured of the amount of filtration residue:

○: the filtration residue was less than 10 mg/L,
Δ: the filtration residue was no less than 10 mg/L but less than 15 mg/L, and
X: the filtration residue was no less than 15 mg/L.

(Note 3) Finished Appearance:

Surface roughness value ($R_a$) of the coated plane of each test panel was measured with SURF TEST 301 (tradename, MITSUTOYO Co., a surface roughness tester) at a cutoff of 0.8 mm:

⊙: the surface roughness value ($R_a$) was less than 0.2 μm,
○: the surface roughness value ($R_a$) was no less than 0.2 μm but less than 0.3 μm,
Δ: the surface roughness value ($R_a$) was no less than 0.3 μm but less than 0.4 μm, and
X: the surface roughness value ($R_a$) was no less than 0.4 μm.

(Note 4) Corrosion Resistance:

Coating film on each of the test panels was cross-cut with a knife to the depth reaching the substrate, and the test panels were given a saline solution spray resistance test for 200 hours, following JIS Z-2371. The evaluation was made according to the following standard widths of rust and blister development from the knife cuts:

⊙: the maximum width of rusting and blistering from the cuts was less than 2 mm (single side),
○: the maximum width of rusting and blistering from the cuts was no less than 2 mm but less than 3 mm (single side),
Δ: the maximum width of rusting and blistering from the cuts was no less than 3 mm but less than 4 mm (single side), and
X: the maximum width of rusting and blistering from the cuts was no less than 4 mm (single side)

(Note 5) Exposure Resistance

The test panels were applied with WP-300 (tradename, Kansai Paint Co., a water-borne intermediate paint) by spray-coating method, to a hardened film thickness of 25 μm, and baked at 140° C.×30 minutes in an electric hot air dryer. Further onto the intermediate coating film NEO AMILAC 6000 (tradename, Kansai Paint Co., a top paint) was applied by spray coating method, to a hardened film thickness of 35 μm, which was subsequently baked at 140° C.×30 minutes in an electric hot air dryer, to provide panels for exposure test.

The coating films on the test panels were given a cross-cuts with a knife to the depth reaching the substrates, and the panels were exposed to the open air in horizontal position for a year in Okinoerabu Island, Kagoshima Prefecture, Japan. The exposure resistance was evaluated according to the rusting and blistering width from the knife cuts, by the following standard:

⊙: the maximum width of rusting and blistering from the cuts was less than 2 mm (single side),
○: the maximum width of rusting and blistering from the cuts was no less than 2 mm but less than 3 mm (single side),
Δ: the maximum width of rusting and blistering from the cuts was no less than 3 mm but less than 4 mm (single side), and
X: the maximum width of rusting and blistering from the cuts was no less than 4 mm (single side)

TABLE 5

|  | Example 1 | Example 2 | Example 3 | Example 4 | Example 5 | Example 6 | Example 7 | Example 8 |
| --- | --- | --- | --- | --- | --- | --- | --- | --- |
| Cationic electro-deposition paint | No. 1 | No. 2 | No. 3 | No. 4 | No. 5 | No. 6 | No. 7A | No. 7B |
| Paint stability (note 2) | ○ | ○ | ○ | ○ | ○ | ○ | ○ | ○ |
| Finished appearance (note 3) | ⊙ | ⊙ | ○ | ○ | ⊙ | ⊙ | ○ | ○ |
| Corrosion resistance (note 4) | ⊙ | ⊙ | ⊙ | ○ | ○ | ○ | ○ | ○ |
| Exposure resistance (note 5) | ⊙ | ⊙ | ○ | ○ | ⊙ | ⊙ | ○ | ○ |

TABLE 6

|  | Comparative Example 1 | Comparative Example 2 | Comparative Example 3 | Comparative Example 4 | Comparative Example 5 | Comparative Example 6 | Comparative Example 7 |
| --- | --- | --- | --- | --- | --- | --- | --- |
| Cationic electro-deposition paint | No. 8 | No. 9 | No. 10 | No. 11 | No. 12 | No. 13 | No. 14 |
| Paint stability (note 2) | ○ | ○ | ○ | ○ | ○ | ○ | ○ |
| Finished appearance (note 3) | ○ | ○ | ○ | ○ | ○ | ○ | ○ |
| Corrosion resistance (note 4) | ○ | ○ | Δ | Δ | Δ | Δ | X |
| Exposure resistance (note 5) | Δ | Δ | Δ | Δ | Δ | Δ | X |

The invention claimed is:

1. An electrodeposition paint comprising a pigment-dispersed paste mixed with an emulsion for electrodeposition paint, wherein the pigment-dispersed paste comprises
   (a) particles of bismuth hydroxide, having an average particle diameter of 50-300 nm;
   (b) at least one paint additive selected from coloring pigment, extender, other rust-preventive pigment and organotin compound;
   (c) a pigment-dispersing resin; and
   (d) a dispersing medium, and
wherein the emulsion comprises
   (i) 50-95 mass % of a base resin comprising a xylene-formaldehyde resin-modified, amino-containing epoxy resin formed by reacting an epoxy resin having an epoxy equivalent of 180-3,000 with xylene-formaldehyde resin and amino-containing compound; and
   (ii) 5-50 mass % of a crosslinking agent, based on the total solid content of the two components (i) and (ii), and
0.01-10 parts by weight of the particles of bismuth hydroxide are contained in the paint per 100 parts by weight of the combined solid content of the base resin and crosslinking agent.

2. The electrodeposition paint as set forth in claim 1, which is a cationic electrodeposition paint.

3. The electrodeposition paint as set forth in claim 1, which is a cationic electrodeposition paint comprising a cationic resin as the base resin and blocked polyisocyanate compound as the crosslinking agent.

4. The electrodeposition paint as set forth in claim 1, in which the pigment-dispersing resin is tertiary amino-containing epoxy resin or quaternary ammonium salt-type epoxy resin.

* * * * *